US011939794B2

(12) United States Patent
Arbegard

(10) Patent No.: US 11,939,794 B2
(45) Date of Patent: Mar. 26, 2024

(54) RELEASE MECHANISM, ENERGY HARVESTING ARRANGEMENT AND ELECTRONIC LOCKING SYSTEM

(71) Applicant: ASSA ABLOY AB, Stockholm (SE)

(72) Inventor: Bernt Arbegard, Järfälla (SE)

(73) Assignee: ASSA ABLOY AB, Stockholm (SE)

( * ) Notice: Subject to any disclaimer, the term of this patent is extended or adjusted under 35 U.S.C. 154(b) by 855 days.

(21) Appl. No.: 16/963,617

(22) PCT Filed: Mar. 20, 2019

(86) PCT No.: PCT/EP2019/056912
§ 371 (c)(1),
(2) Date: Jul. 21, 2020

(87) PCT Pub. No.: WO2019/180059
PCT Pub. Date: Sep. 26, 2019

(65) Prior Publication Data

US 2021/0062545 A1 Mar. 4, 2021

(30) Foreign Application Priority Data

Mar. 23, 2018 (EP) .................................... 18163507

(51) Int. Cl.
*E05B 47/00* (2006.01)

(52) U.S. Cl.
CPC .... *E05B 47/0003* (2013.01); *E05B 2047/002* (2013.01); *E05B 2047/0062* (2013.01);
(Continued)

(58) Field of Classification Search
CPC ................. E05B 47/00; E05B 47/0003; E05B 2047/002; E05B 2047/0062;
(Continued)

(56) References Cited

U.S. PATENT DOCUMENTS 3,733,861 A 5/1973 Lester
2012/0111072 A1 5/2012 Pukari et al.

FOREIGN PATENT DOCUMENTS

CN 2608633 3/2004
CN 101360881 2/2009
(Continued)

OTHER PUBLICATIONS

"International Application Serial No. PCT EP2019 056912, International Preliminary Report on Patentability dated Oct. 8, 2020", 7 pages.

(Continued)

*Primary Examiner* — Suzanne L Barrett
(74) *Attorney, Agent, or Firm* — Schwegman Lundberg & Woessner, P.A.

(57) ABSTRACT

Release mechanism (12) for an energy harvesting arrangement (10) for an electronic locking system (78), the release mechanism (12) comprising a drive device (18); a harvesting elastic element (30); at least one magnet (36); an input device (38); and an engaging profile (52); wherein the input device (38) is arranged to engage the drive device (18) by means of a magnetic force such that the drive device (18) can be displaced from a starting position (32) by movement of the input device (38) along a harvesting path (58); and wherein the engaging profile (52) is arranged to engage the drive device (18) at an engaging position (60) of the drive device (18), such that further movement of the input device (38) along the harvesting path (58) causes a relative inclination between a drive device surface (26) and a input device surface (42). An energy harvesting arrangement (10) and an electronic locking system (78) are also provided.

16 Claims, 6 Drawing Sheets

(52) U.S. Cl.
CPC ... *E05Y 2201/462* (2013.01); *E05Y 2201/716* (2013.01); *E05Y 2201/722* (2013.01); *E05Y 2400/616* (2013.01); *E05Y 2900/132* (2013.01)

(58) Field of Classification Search
CPC ......... E05Y 2201/462; E05Y 2201/716; E05Y 2201/722; E05Y 2400/616; E05Y 2900/132; Y10T 70/7051
USPC ............................................................ 70/275
See application file for complete search history.

(56) References Cited

FOREIGN PATENT DOCUMENTS

| | | |
|---|---|---|
| CN | 202079544 | 12/2011 |
| EP | 3543442 | 9/2019 |
| EP | 3543442 | 7/2020 |
| GB | 2347800 | 9/2000 |
| WO | WO 2013/085057 | 6/2013 |
| WO | 2019180059 | 9/2019 |

OTHER PUBLICATIONS

"European Application Serial No. 18163507.9, Response filed Feb. 19, 2020 to Extended European Search Report dated Sep. 11, 2018", 2 pages.
"European Application Serial No. 18163507.9, Intention to Grant dated Mar. 30, 2020", 35 pages.
"KR Office Action dated Aug. 2, 2023", with English translation, (Aug. 2, 2023), 5 pages.
Extended Search Report for European Patent Application No. 18163507.9, dated Sep. 11, 2018, 4 pages.
International Search Report and Written Opinion for International (PCT) Patent Application No. PCT/EP2019/056912, dated May 20, 2019, 11 pages.
Official Action with English Translation for China Patent Application No. 201980020901.8, dated Mar. 1, 2021, 11 pages.

RELEASE MECHANISM, ENERGY HARVESTING ARRANGEMENT AND ELECTRONIC LOCKING SYSTEM

CROSS REFERENCE TO RELATED APPLICATIONS

This application is a national stage application under 35 U.S.C. 371 and claims the benefit of PCT Application No. PCT/EP2019/056912 having an international filing date of Mar. 20, 2019, which designated the United States, which PCT application claimed the benefit of Europe Patent Application No. 18163507.9 filed Mar. 23, 2018, the disclosure of each of which are incorporated herein by reference.

TECHNICAL FIELD

The present disclosure generally relates to a release mechanism. In particular, a release mechanism for an energy harvesting arrangement for an electronic locking system, an energy harvesting arrangement comprising the release mechanism, and an electronic locking system comprising the release mechanism or the energy harvesting arrangement, are provided.

BACKGROUND

Various types of electronic locking systems are known, such as digital door locks (DDL). Instead of utilizing a purely mechanical lock, some locking systems include an electronic drive of a lock member (e.g. a lock bolt) to unlock, for example, a door to give access to the area behind the door.

Furthermore, instead of utilizing a traditional key to unlock the door, various types of electronic communication methods for authorizing a person to access the area behind the door are known. For example, a Radio Frequency Identification (RFID) system may be used where a reader of the RFID system is installed in the door and a tag is carried by or attached to an object to be identified.

In order to power an electronic locking system, so called "self-powered" electronic locking systems have been proposed, where electricity is generated by a mechanical actuation of a door handle and is used to power the electronic locking system. This concept is also known as energy harvesting. The use of kinetic energy harvesting can replace, or prolong the lifetime of, batteries in electronic locking systems.

US 2012111072 A1 discloses an electromechanical lock including a power transmission mechanism to receive mechanical power produced by a user of the lock; a generator to produce electric power from the mechanical power; an electronic circuit, powered by the electric power, coupleable with a key, to read data from the key, and to issue an open command provided that the data matches a predetermined criterion; an actuator, powered by the electric power, to receive the open command, and to set the lock in a mechanically openable state; and a threshold device to control the power transmission mechanism so that a mechanical tension rises until a predetermined force threshold is exceeded, whereupon the mechanical tension transforms to an action producing the mechanical power received by the power transmission mechanism.

SUMMARY

Prior art energy harvesting arrangements for electronic locking systems are often complex and cause wear and tear of the components involved. Many prior art energy harvesting arrangements are also noisy.

In US 2012111072 A1, the mechanical tension in the power transmission mechanism transforms to an action when exceeding a predetermined force threshold. This type of release requires a relatively high extra force in the release point. This may cause the handle movement to feel odd and/or low quality to the user. Many prior art energy harvesting arrangements also have an inconsistent energy level for release.

One object of the present disclosure is to provide a position controlled release mechanism for an energy harvesting arrangement for an electronic locking system.

A further object of the present disclosure is to provide a release mechanism which requires a low amount of extra force to be released.

A still further object of the present disclosure is to provide a release mechanism that is more silent.

A still further object of the present disclosure is to provide a release mechanism that has a simple design, e.g. that requires fewer components.

A still further object of the present disclosure is to provide a release mechanism that has high efficiency, such as low friction losses.

A still further object of the present disclosure is to provide a release mechanism that is durable, e.g. with low sensitivity to wear and tear.

A still further object of the present disclosure is to provide a release mechanism that is cheap.

A still further object of the present disclosure is to provide a release mechanism that provides a reliable and consistent feedback in a handle or key over time.

A still further object of the present disclosure is to provide a release mechanism that provides an improved user experience.

A still further object of the present disclosure is to provide a release mechanism solving several or all of the foregoing objects.

A still further object of the present disclosure is to provide an energy harvesting system comprising a release mechanism, which energy harvesting system solves one, several or all of the foregoing objects.

A still further object of the present disclosure is to provide an electronic locking system comprising a release mechanism, which electronic locking system solves one, several or all of the foregoing objects.

According to one aspect, there is provided a release mechanism for an energy harvesting arrangement for an electronic locking system, the release mechanism comprising a drive device for driving an electromagnetic generator, the drive device comprising a substantially planar, or planar, drive device surface; a harvesting elastic element arranged to force the drive device towards a starting position, and arranged to store mechanical energy from displacement of the drive device from the starting position along a harvesting path; at least one magnet; an input device, the input device being movable along the harvesting path, and comprising a substantially planar, or planar, input device surface arranged to mate with the drive device surface to establish a mating interface; and an engaging profile arranged offset with respect to the mating interface; wherein the input device is arranged to engage the drive device by means of a magnetic force, generated by the magnet and acting between the drive device surface and the input device surface, such that the drive device can be displaced from the starting position by movement of the input device along the harvesting path; and wherein the engaging profile is arranged to engage the drive device at an engaging position of the drive device, such that further movement of the input device along the harvesting path causes a relative inclination between the drive device surface and the input device surface.

By relatively inclining or tilting the drive device surface and the input device surface, an inclined load is established at the mating interface. The air gap that arises between the drive device surface and the input device surface causes the magnetic force to rapidly decrease as the input device is moved further along the harvesting path. This collapse of the magnetic force causes the drive device to be released.

Since further movement of the input device along the harvesting path when the drive device is engaged by the engaging profile causes a relative inclination between the drive device surface and the input device surface, the amount of extra force required for the release is substantially reduced. The amount of friction to be overcome for the release is also substantially lower than in prior art solutions. As a consequence, the efficiency of the release mechanism is increased, the wear and tear of the release mechanism is reduced, and the user experience is improved.

Furthermore, the rapid collapse of the magnetic force when the drive device surface and the input device surface start to tilt relative to each other results in a release of the drive device at a defined position of the input device along the harvesting path. In other words, the release is position controlled in contrast to, for example, the power transmission mechanism in US 2012111072 A1 which is based on a threshold force. Due to this position controlled release, variations of the strength of the magnetic field due to, for example, temperature or production parameter spread will not affect the function of the release mechanism.

Furthermore, the position-based release of the release mechanism according to the present disclosure is more consistent over time in comparison with prior art force-based release mechanisms. The magnet-based release mechanism according to the present disclosure is also more silent and less exposed to wear and tear.

Furthermore, since the drive device is always released when the input device moves further after engagement between the drive device and the engaging profile, the release mechanism includes an intrinsic damage protection, i.e. a limitation of the maximum force that can be applied on the drive device.

Throughout the present disclosure, the input device may be arranged to receive power produced by a user, such as a user of an electronic locking system comprising the energy harvesting system which in turn comprises the release mechanism.

The drive device may be arranged to drive a rotor of the electromagnetic generator, either directly, or indirectly. The rotor may be constituted by a driven wheel, such as a driven gear wheel or a driven friction wheel.

The harvesting elastic element may store mechanical energy from displacement of the drive device from the starting position along the harvesting path either by compression or by expansion. The harvesting elastic element may be preloaded when the drive device is in the starting position.

The harvesting elastic element may for example be constituted by a spring, such as a coil spring. Alternative harvesting elastic elements are possible, including for example a piece of elastic material. The harvesting elastic element may alternatively be referred to as an elastic element.

The magnet may be a permanent magnet. The magnet may comprise, or be constituted by, Neodynium, a Neodymium alloy such as a Neodymium-Iron-Boron (NdFeB), or other material having a relatively high intrinsic coercivity. The release mechanism according to the present disclosure may comprise one or several magnets.

The input device may be said to be arranged on a primary side of the release mechanism and the drive device may be said to be arranged on a secondary side of the release mechanism. Thus, throughout the present disclosure, the input device may alternatively be referred to as a primary device and/or the drive device may alternatively be referred to as a secondary device.

The release mechanism may comprise a hinge arranged to support the relative inclination between the drive device surface and the input device surface. A leverage can thereby be obtained by means of the hinge and the engaging profile. The leverage makes it possible to dynamically control the release mechanism.

The hinge may be provided in the drive device and support inclination of the drive device surface. Alternatively, the hinge may be provided in the input device and support inclination of the input device surface. Alternatives to a hinge are possible, including for example the provision of one or more elastic elements in the drive device and/or in the input device for enabling a relative inclination between the drive device surface and the input device surface.

The hinge may be substantially centered, or centered, with respect to the magnet when the planar input device surface and the drive device surface mate.

The release mechanism may comprise a plate, wherein the plate comprises the drive device surface or the input device surface. The plate may comprise one or more materials responsive to magnetic fields. The plate may for example be a steel plate, or may comprise steel.

According to one variant, the drive device comprises the plate, optionally supported by means of a hinge. In this case, the input device may comprise the magnet. According to an alternative variant, the input device comprises the plate, optionally supported by means of a hinge. In this case the drive device may comprise the magnet.

The magnetic force may be 10% to 30% larger than the force from the harvesting elastic element when the drive device is in the engaging position. Thereby, it can be ensured that the drive device is not released immediately when coming in contact with the engaging profile in the engaging position.

The input device may be arranged to engage the drive device by means of an attractive magnetic force. It is however alternatively possible to base the release mechanism according to the present disclosure on a repelling magnetic force, i.e. such that the input device is arranged to engage the drive device by means of a repelling magnetic force.

The mating interface may be substantially perpendicular, or perpendicular, to the harvesting path. The mating interface may be constituted by the area of contact between the drive device surface and the input device surface.

The harvesting path may be substantially linear, or linear. Alternatively, the harvesting path may be substantially circular, or circular.

According to a further aspect, there is provided an energy harvesting arrangement comprising a release mechanism according to the present disclosure. The energy harvesting arrangement may comprise the electromagnetic generator drivable by the drive device. The electromagnetic generator may be arranged to produce electric power from the mechanical power input by a user to the input device. A standard electromagnetic generator may be used in the energy harvesting arrangement. The drive device may drive the electromagnetic generator directly or indirectly. The energy harvesting arrangement may comprise a transmission, such as a gear train, between the drive device and the electromagnetic generator. This may be suitable for smaller electromagnetic generators.

The drive device may be arranged to not engage the rotor of the electromagnetic generator when the drive device adopts the starting position and such that the drive device starts to engage the rotor when the drive device is displaced along the harvesting path from the starting position. Thereby, the electromagnetic generator does not need to comprise a freewheel. Furthermore, the rotor of the electromagnetic generator is allowed to spin freely after release and when the drive device has returned to the starting position, e.g. functionally "beyond" the rotor. In case the drive device and the rotor comprise teeth, the rotor and/or the drive device may be resiliently supported to assist in initiation of meshing of the teeth.

The energy harvesting arrangement may be used in various types of electronic locking systems, e.g. various door opening solutions. The energy harvesting arrangement may comprise a transmission, such as a gear transmission, to transmit a manual movement (e.g. handle movement, door movement, or key movement) to a movement of the input device along the harvesting path.

The energy harvesting arrangement may further comprise a handle operatively coupled to the input device. Thereby, manual actuation of the handle can be used to drive the input device of the release mechanism. In this case, the energy harvesting arrangement may comprise a transmission, e.g. a gear train, to transmit a rotation of the handle to a movement of the input device. The gear train may be arranged to transmit a rotation of the handle, e.g. of 40° to 45°, to a movement (either linear or rotational) of the input device beyond the releasing position.

Alternatively, the energy harvesting arrangement may further comprise an access member hinge operatively coupled to the input device. The access member hinge may be arranged to support an access member relative to a frame. Thereby, an opening or closing movement of the access member can be used to drive the input device of the release mechanism.

Alternatively, the input device may be arranged to be actuated by means of a key. For example, the input device may be pushed to move along the harvesting path by insertion of the key. According to one variant, the input device is arranged to be directly contacted by the key.

Further non-limiting application examples of the energy harvesting arrangements according to the present disclosure include door closers and windows.

According to a further aspect, there is provided an electronic locking system comprising a release mechanism according to the present disclosure, or an energy harvesting arrangement according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1A:
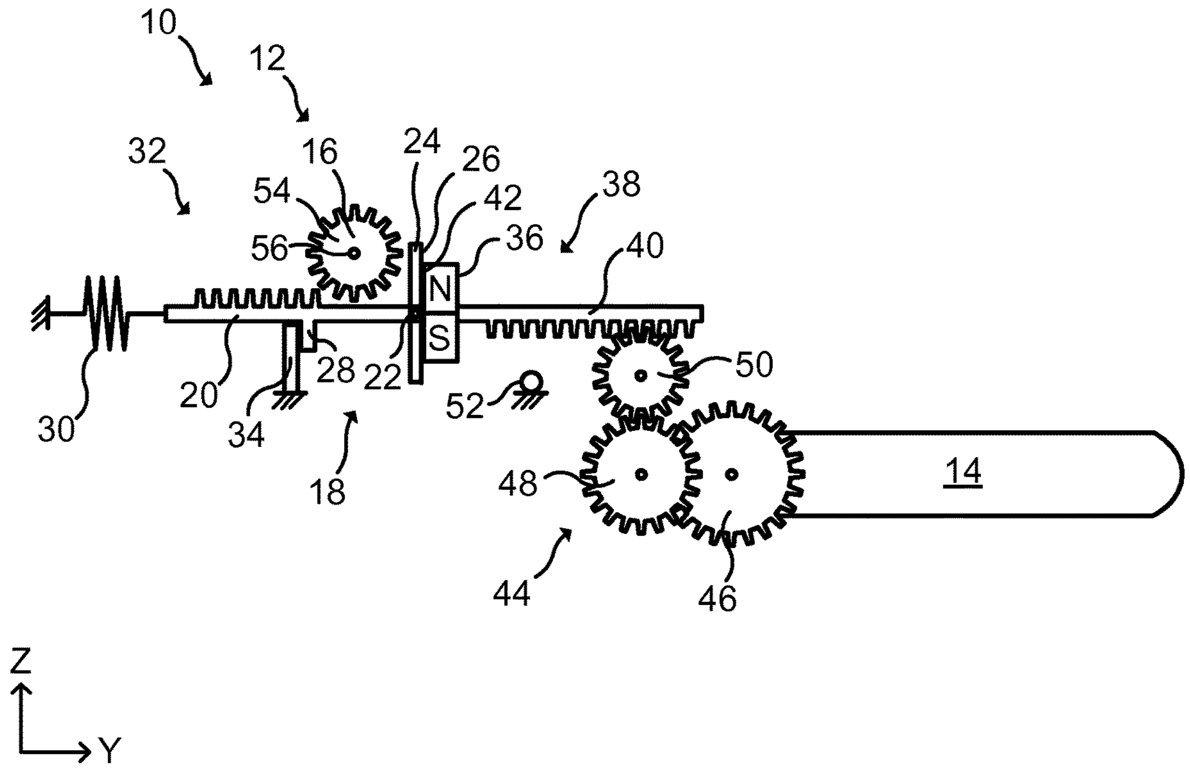
FIGS. 1a-1d: schematically represent one example of an energy harvesting system comprising one example of a release mechanism.

In the following, a release mechanism for an energy harvesting arrangement for an electronic locking system, an energy harvesting arrangement comprising the release mechanism, and an electronic locking system comprising the release mechanism or the energy harvesting arrangement, will be described. The same reference numerals will be used to denote the same or similar structural features.

FIGS. 1a-1d schematically represent one example of an energy harvesting arrangement 10 comprising one example of a release mechanism 12. The energy harvesting arrangement 10 of this example further comprises a manual handle 14 and an electromagnetic generator 16. FIGS. 1a-1d further indicates a Cartesian coordinate system for referencing purposes. The energy harvesting arrangement 10 may however be oriented arbitrarily in space.

With reference to FIG. 1a, the release mechanism 12 comprises a drive device 18. The drive device 18 is arranged to drive the electromagnetic generator 16.

The drive device 18 of this example comprises a drive member 20, a hinge 22 and a plate 24, here constituted by a steel plate. The plate 24 is rotationally coupled to the drive member 20 by means of the hinge 22. The drive device 18 further comprises a planar drive device surface 26, in this example constituted by a surface of the plate 24 (facing to the right in FIG. 1a).

The drive device 18 of this example further comprises a stop portion 28, here implemented as a projection on the drive member 20. The drive device 18 further comprises drive device teeth (not denoted), here implemented on the drive member 20.

The release mechanism 12 further comprises a harvesting elastic element 30, here implemented as a coil spring. The harvesting elastic element 30 is connected to the drive device 18, in this example to the drive member 20, and to a stationary structure of the energy harvesting arrangement 10. The stationary structure is stationary in relation to the energy harvesting arrangement 10, but may be movable in space.

The harvesting elastic element 30 is arranged to force the drive device 18 towards a starting position 32 according to FIG. 1a. In the starting position 32, the harvesting elastic element 30 is preloaded and holds the drive device 18 in the starting position 32. The energy harvesting arrangement 10 further comprises a stationary stop structure 34 (stationary with respect to the energy harvesting arrangement 10). In the starting position 32 of the drive device 18 according to FIG. 1a, the stop portion 28 of the drive device 18 abuts against the stop structure 34.

The release mechanism 12 further comprises a magnet 36 and an input device 38. In this example, the input device 38 comprises the magnet 36 and an input member 40 to which the magnet 36 is rigidly connected. The input device 38 comprises a planar input device surface 42, here constituted by a surface of the magnet 36 (facing to the left in FIG. 1a).

The input device 38 of this example further comprises input device teeth (not denoted), here implemented on the input member 40.

The energy harvesting arrangement 10 of the example in FIG. 1*a* further comprises a transmission 44 for transmitting a rotation of the handle 14 to a linear movement of the input device 38. The transmission 44 is in this example constituted by a gear train comprising a first gear wheel 46, a second gear wheel (not visible), a third gear wheel 48 and a fourth gear wheel 50. The handle 14 is rigidly connected to the first gear wheel 46, the first gear wheel 46 is in meshing engagement with the second gear wheel (behind the third gear wheel 48 in FIG. 1*a*), the second gear wheel is rigidly connected to the third gear wheel 48, the third gear wheel 48 is in meshing engagement with the fourth gear wheel 50, and the fourth gear wheel 50 is in meshing engagement with the input device teeth of the input member 40. The transmission 44 between the handle 14 and the input device 38 is merely one of numerous possible transmissions for operatively coupling the handle 14 to the input device 38.

In FIG. 1*a*, the input device surface 42 mates with the drive device surface 26 and a mating interface between the magnet 36 and the plate 24 is established. The hinge 22 of the drive device 18 is centered with respect to the magnet 36 when the input device surface 42 mates with the drive device surface 26 mate. The magnet 36 is held in engagement with the plate 24 by means of an attractive magnetic force from the magnet 36 and acting on the plate 24. The mating interface is constituted by the contact area between the drive device surface 26 and the input device surface 42.

As can be gathered from FIG. 1*a*, the drive device surface 26 of the plate 24 has a larger height (larger dimension in the Z-direction) than the input device surface 42 of the magnet 36. Thereby, the plate 24 protrudes over the sides of the magnet 36. Each of the drive device surface 26 and the input device surface 42 may for example be quadrangular, such as rectangular or quadratic.

The energy harvesting arrangement 10 of the example in FIG. 1*a* further comprises an engaging profile 52. The engaging profile 52 constitutes a stop member, here exemplified as a stop pin. The engaging profile 52 is stationary with respect to the energy harvesting arrangement 10. The engaging profile 52 does however not necessarily need to be stationary in space. For example, if the energy harvesting arrangement 10 is implemented in a door, also the engaging profile 52 may move together with the door.

The electromagnetic generator 16 comprises a rotor, here implemented as a driven gear wheel 54, rotatable about a rotor rotational axis 56. The drive device teeth of the drive member 20 are arranged to engage the teeth of the driven gear wheel 54 and rotate the driven gear wheel 54 by means of a linear movement of the drive device 18. However, in FIG. 1*a*, the drive device teeth of the drive member 20 are disengaged from the gear wheel of the electromagnetic generator 16.

In FIG. 1*a*, the handle 14, the transmission 44 and the input device 38 may be said to be components of a primary side of the energy harvesting arrangement 10. The drive device 18 and the electromagnetic generator 16 may be said to be components of a secondary side of the energy harvesting arrangement 10.

Figure 1B:
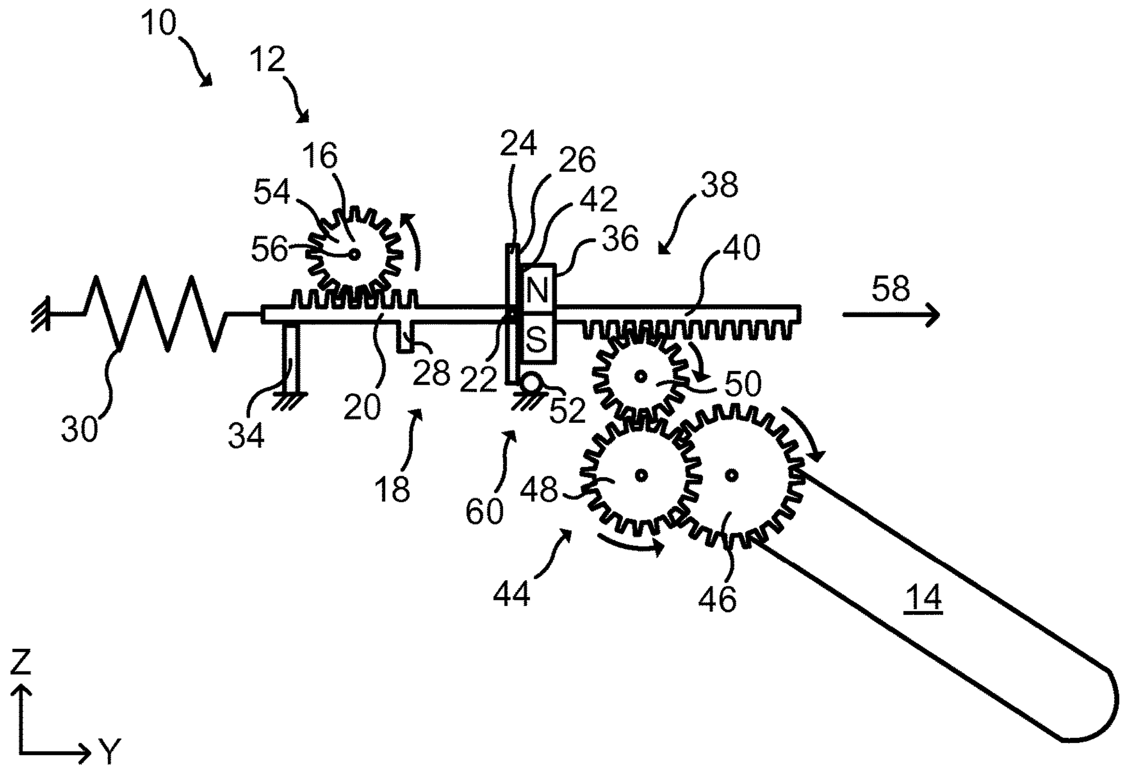

With reference to FIGS. 1*a*-1*d*, a method of operating the energy harvesting arrangement 10 will now be described. When the handle 14 is rotated in a first direction by a user as indicated in FIG. 1*b*, an external force is applied on the input device 38 (due to the transmission 44) and the input device 38 starts to move linearly in an outbound direction along a harvesting path 58.

Since the input device 38 engages the drive device 18 by means of a magnetic force, generated by the magnet 36 of the input device 38 and acting on the plate 24 of the drive device 18, the drive device 18 is displaced from the starting position 32 by the movement of the input device 38 along the harvesting path 58. As the drive device 18 is displaced from the starting position 32 along the harvesting path 58, mechanical energy is stored in the harvesting elastic element 30. That is, the harvesting elastic element 30 is tensioned more (or starts to be tensioned in case the harvesting elastic element 30 is not preloaded in the starting position 32).

During this outbound movement of the drive device 18, the drive device 18 also starts to engage the rotor of the electromagnetic generator 16, which thereby rotates slowly, as indicated in FIG. 1*b*. More specifically, the drive device teeth of the drive member 20 are brought in meshing engagement with the teeth of the driven gear wheel 54. At this stage, the energy harvesting is low. However, the energy harvested from this rotation of the driven gear wheel 54 may be used to wake up and perform an access control procedure of an access control device (described in FIG. 5), for example by means of BLE (Bluetooth Low Energy) communication.

During the outbound movement of the input device 38 and the drive device 18 along the harvesting path 58, the holding force between the input device 38 and the drive device 18 is entirely magnetic. In the position of the drive device 18 in FIG. 1*b*, the engaging profile 52 starts to engage the drive device 18. This position of the drive device 18 constitutes an engaging position 60. More specifically, in the engaging position 60, a part of the plate 24 that protrudes outside the mating interface starts to contact the engaging profile 52. Thus, the engaging profile 52 is arranged offset with respect to the mating interface between the drive device surface 26 and the input device surface 42. As can be seen in FIG. 1*b*, the mating interface is also substantially perpendicular to the harvesting path 58. When the drive device 18 adopts the engaging position 60 according to FIG. 1*b*, the holding force of the magnet 36 is approximately 10% to 30% larger than the force in the harvesting elastic element 30.

Figure 1C:
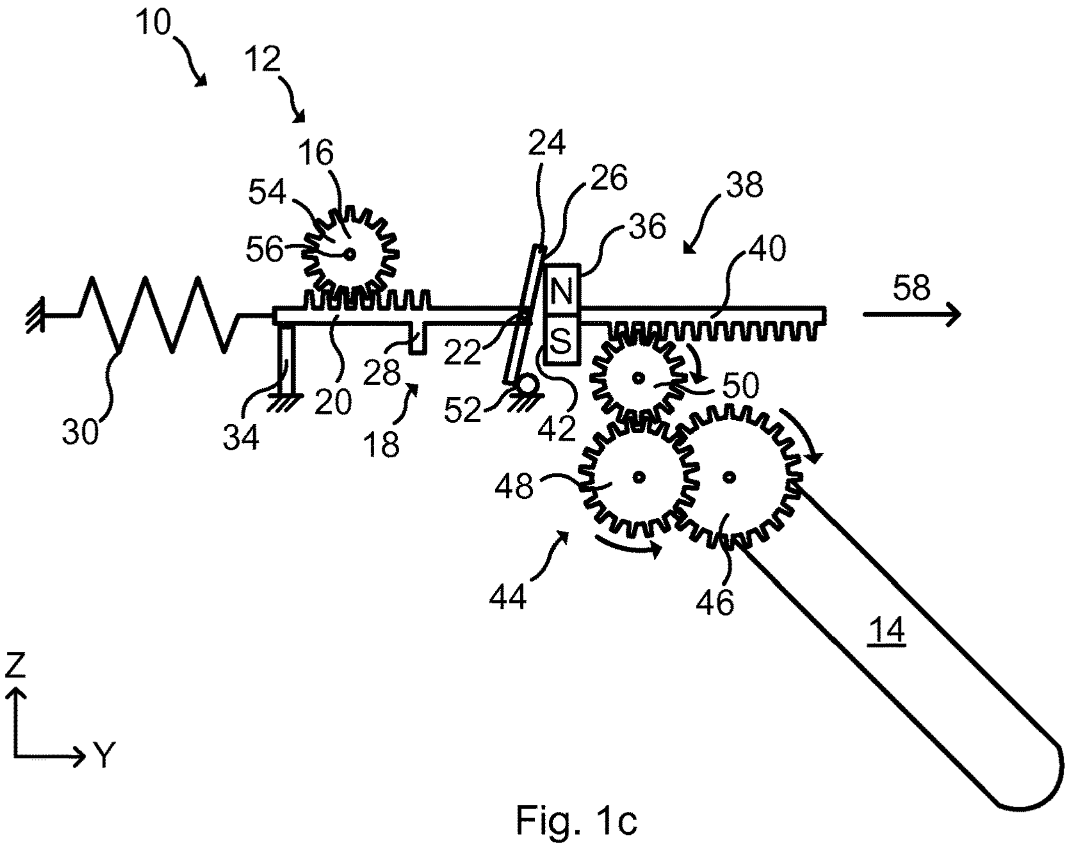

FIG. 1*c* shows how the input device 38 makes a slight further outbound movement along the energy harvesting path 58. However, since the plate 24 is stopped by the engaging profile 52, the plate 24 starts to incline or tilt (in the clockwise direction in FIG. 1*c*). Thus, a relative inclination between the drive device surface 26 and the input device surface 42 occurs. The hinge 22 supports the relative inclination between the drive device surface 26 of the plate 24 and the input device surface 42 of the magnet 36. In this example, the engagement of the plate 24 by the engaging profile 52 and the hinge 22 provide a leverage. The force on the hinge 22 is relatively low.

Figure 1D:
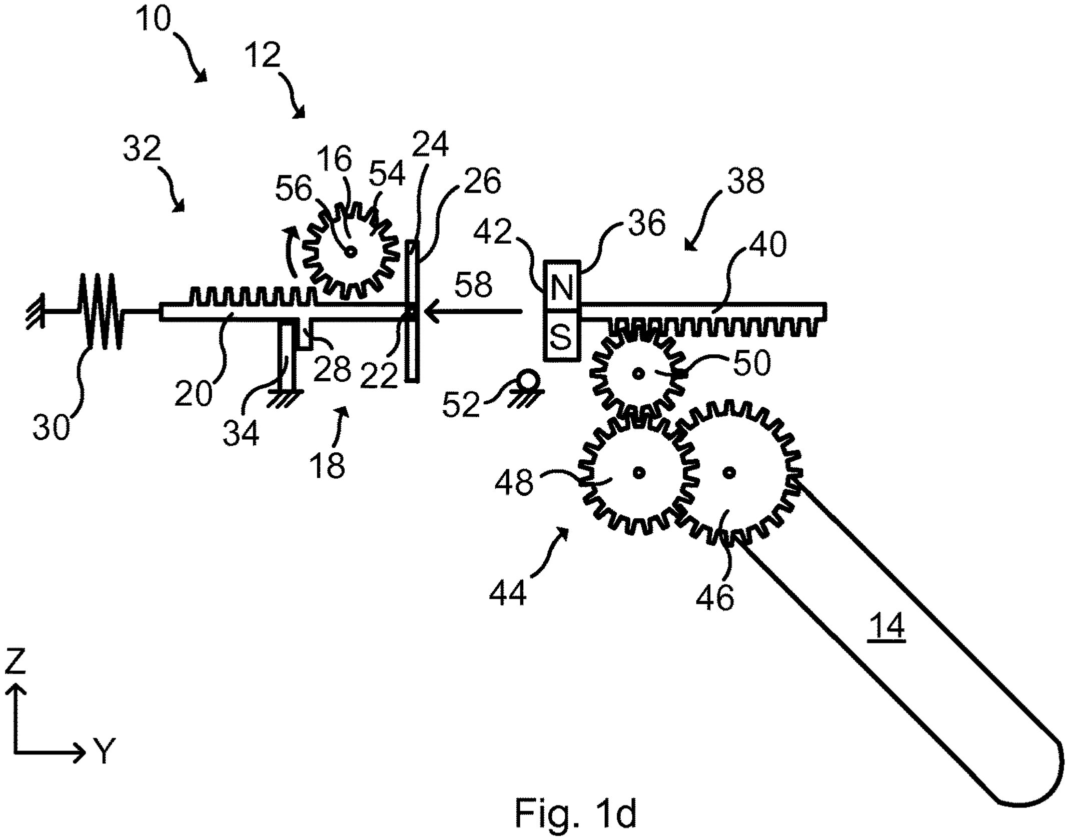

The magnet 36 is sensitive to air gaps. Thus, due to the relative inclination, the magnetic force is rapidly reduced and the release mechanism 12 is released, i.e. the harvesting elastic element 30 pulls the drive device 18 rapidly in a return movement along the harvesting path 58 to the starting position 32 as illustrated in FIG. 1*d* and a relatively high amount of energy is harvested by the electromagnetic generator 16. Since the drive device 18 does not engage the driven gear wheel 54 of the electromagnetic generator 16 in the starting position 32, the driven gear wheel 54 is allowed to spin until the energy from the release fades out. The gear ratio between the teeth of the drive member 20 and the driven gear wheel 54 may be optimized depending on the type of electromagnetic generator 16 used.

Due to the release of the release mechanism 12 by means of a relative inclination between the drive device surface 26 and the input device surface 42, the force required for release is reduced. The release of the drive device 18 due to a rapidly decreasing magnetic force in this way is also relatively silent.

After release, a return spring in the handle 14 will return the handle 14 and the input device 38 to a starting position and a new energy harvesting cycle may be repeated.

FIGS. 2*a*-2*d* schematically represent a further example of an energy harvesting arrangement 10 comprising further example of a release mechanism 12. Mainly differences from FIGS. 1*a*-1*d* will be described.

Figure 2A:
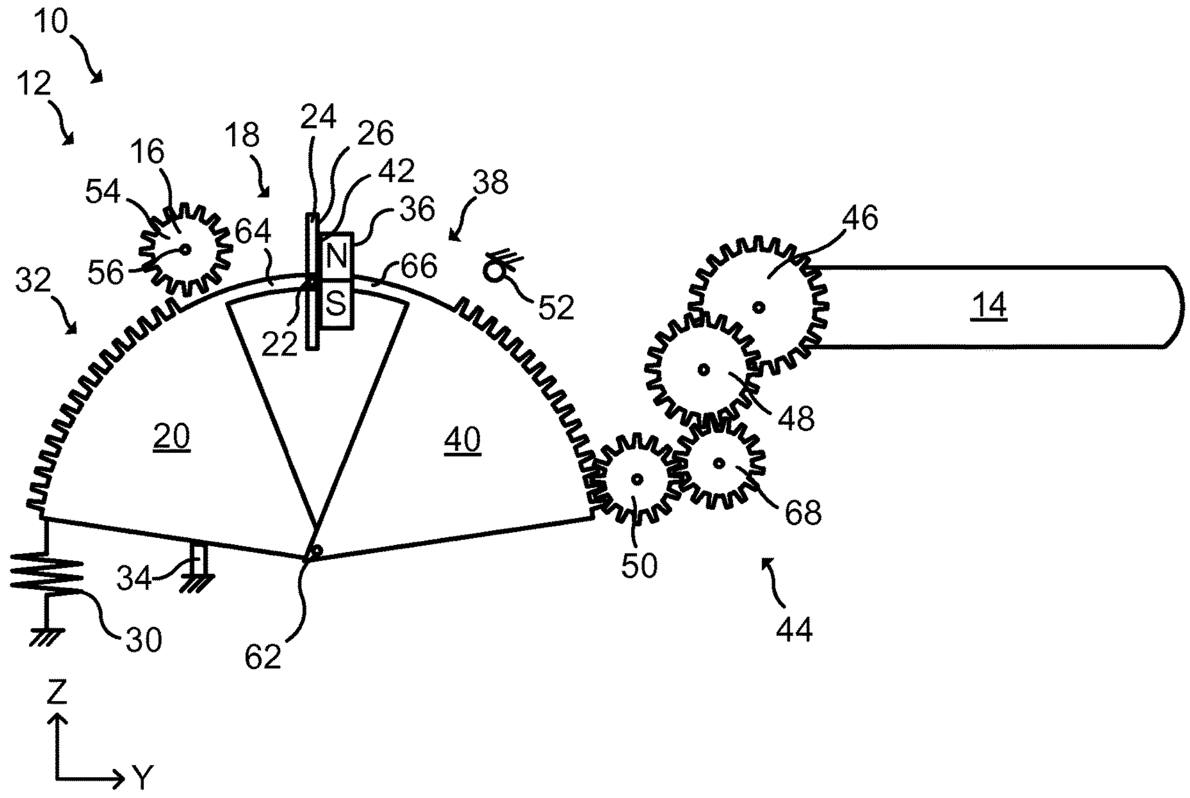
FIGS. 2a-2d: schematically represent a further example of an energy harvesting system comprising further example of a release mechanism.

In the example in FIGS. 2*a*-2*d*, both the input device 38 and the drive device 18 are movable along a circular harvesting path 58. With reference to FIG. 2*a*, the drive device 18 comprises a drive member 20, here constituted by a sector gear, pivotally arranged about a rotational axis 62. The drive device 18 further comprises a drive device extension 64 protruding from the drive member 20. The plate 24 is rotationally supported relative to the drive device 18 by means of the hinge 22, which is provided at the end of the drive device extension 64.

The input device 38 comprises an input member 40, here constituted by a sector shaped member, pivotally arranged about the rotational axis 62. The input device 38 further comprises an input device extension 66 protruding from the input member 40. The magnet 36 is rigidly connected to the end of the input device extension 66.

The transmission 44 is also in this example constituted by a gear train, but comprises a further gear wheel 68 between the third gear wheel 48 and the fourth gear wheel 50.

In the starting position 32 of the drive device 18 in FIG. 2*a*, a side of the drive device 18 is held against the stop structure 34 by means of the tension force in the harvesting elastic element 30. Furthermore, the input device 38 engages the drive device 18 by means of a magnetic force, generated by the magnet 36 and acting between the drive device surface 26 and the input device surface 42.

Figure 2B:
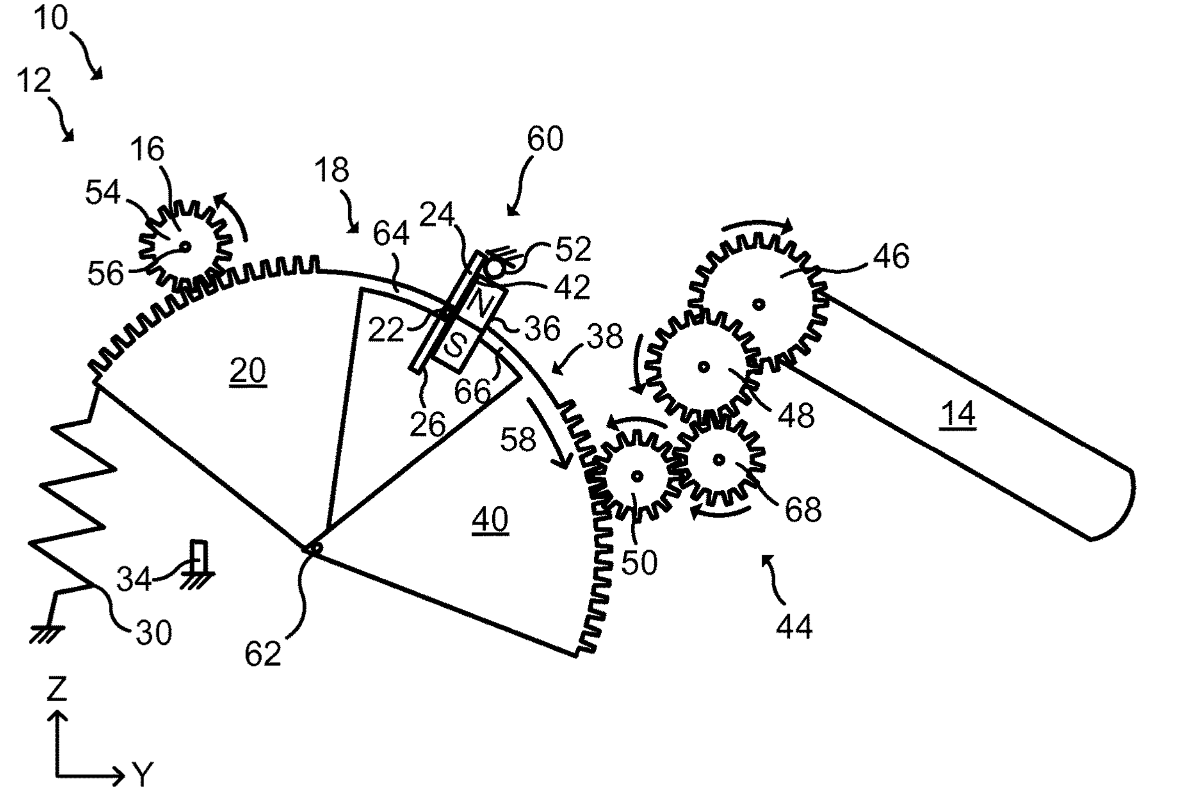

By manually rotating the handle 14, as shown in FIG. 2*b*, the input device 38 and the drive device 18, which is held by the magnetic force, rotate in an outbound direction along the circular harvesting path 58. Energy from the outbound displacement of the drive device 18 from the starting position 32 is stored by the harvesting elastic element 30.

Figure 2C:
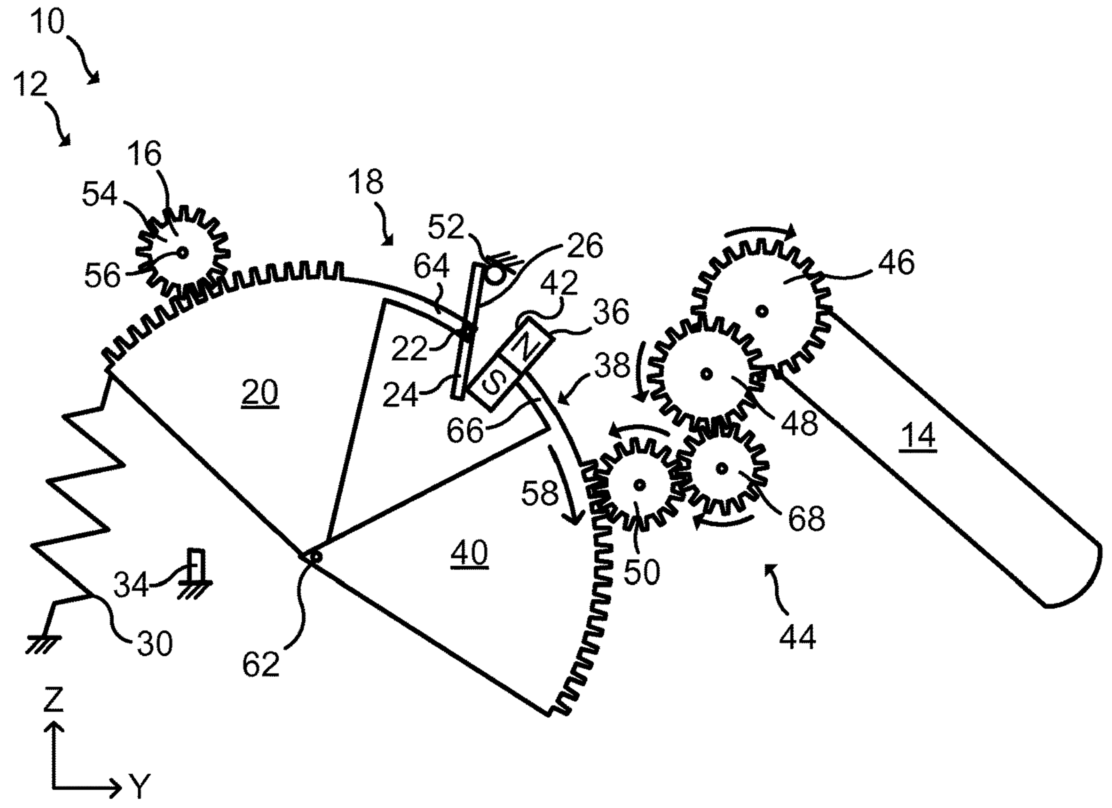
Figure 2D:
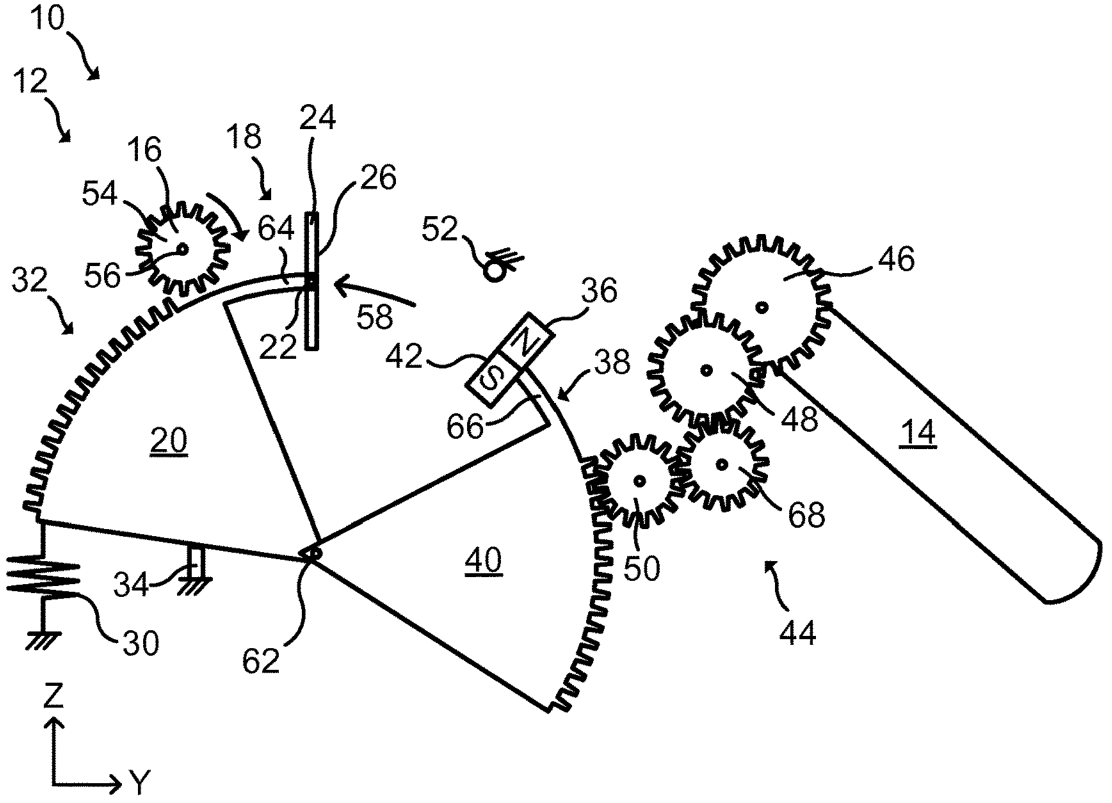

At the engaging position 60 of the drive device 18 of FIG. 2*b*, the plate 24 is brought into contact with the engaging profile 52. Further outbound movement of the input device 38 along the harvesting path 58 causes a relative inclination between the drive device surface 26 and the input device surface 42 due to the leverage provided by the hinge 22 and the engaging profile 52, as shown in FIG. 2*c*. As a consequence, the magnetic holding force is rapidly decreased causing a release of the release mechanism 12. The harvesting elastic element 30 now pulls the drive device 18 to make a return movement along the circular harvesting path 58 while energy of the movement is harvested by the electromagnetic generator 16, as shown in FIG. 2*d*. The drive device teeth on the drive member 20 move past the driven gear wheel 54 of the electromagnetic generator 16. The driven gear wheel 54 is thereby allowed to spin freely until the speed fades out.

After release, a return spring in the handle 14 will return the handle 14 and the input device 38 to a starting position and a new energy harvesting cycle may be repeated.

Figure 3:
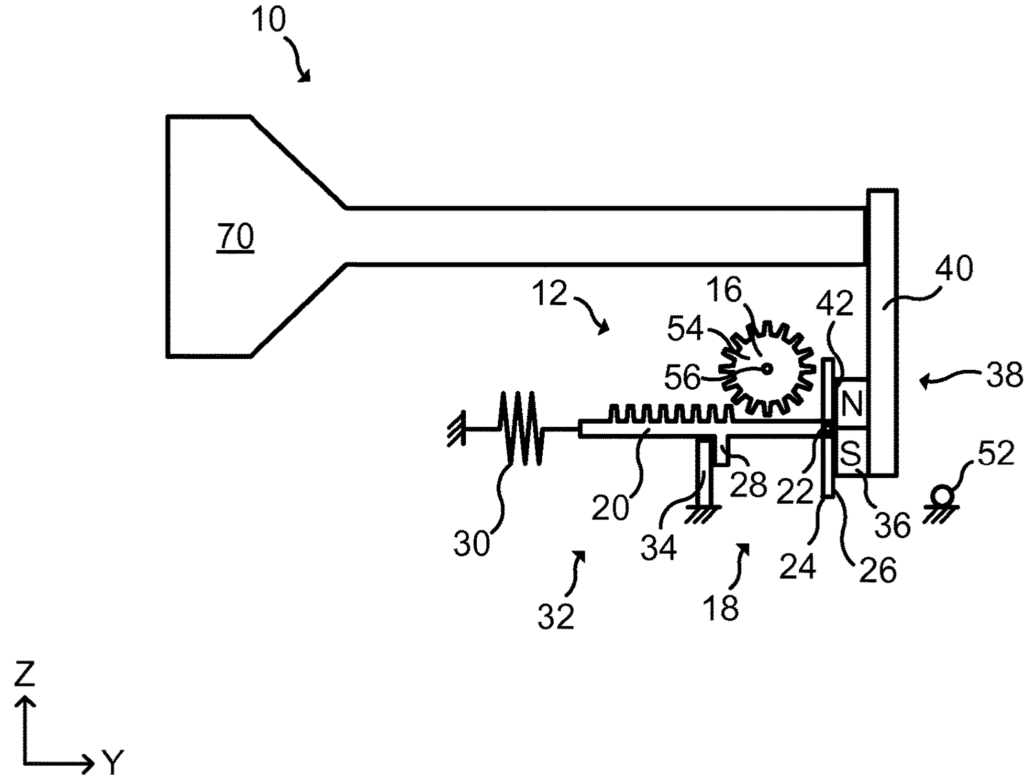
FIG. 3: schematically represents a further example of an energy harvesting system, a further example of a release mechanism and a key.

FIG. 3 schematically represents a further example of an energy harvesting arrangement 10, a further example of a release mechanism 12 and a key 68. Mainly differences with respect to FIGS. 1*a*-1*d* will be described.

Instead of being coupled to a handle 14 by means of a transmission 44 according to FIGS. 1*a*-1*d*, the input device 38 of the example in FIG. 3 comprises an input member 40 that can be actuated, directly or indirectly, by insertion of a key. The input member 40 may be constituted by a plate. Otherwise, the input device 38 of the release mechanism 12 in FIG. 3 has the same function as the input device 38 of the release mechanism 12 in FIGS. 1*a*-1*d*.

Figure 4:
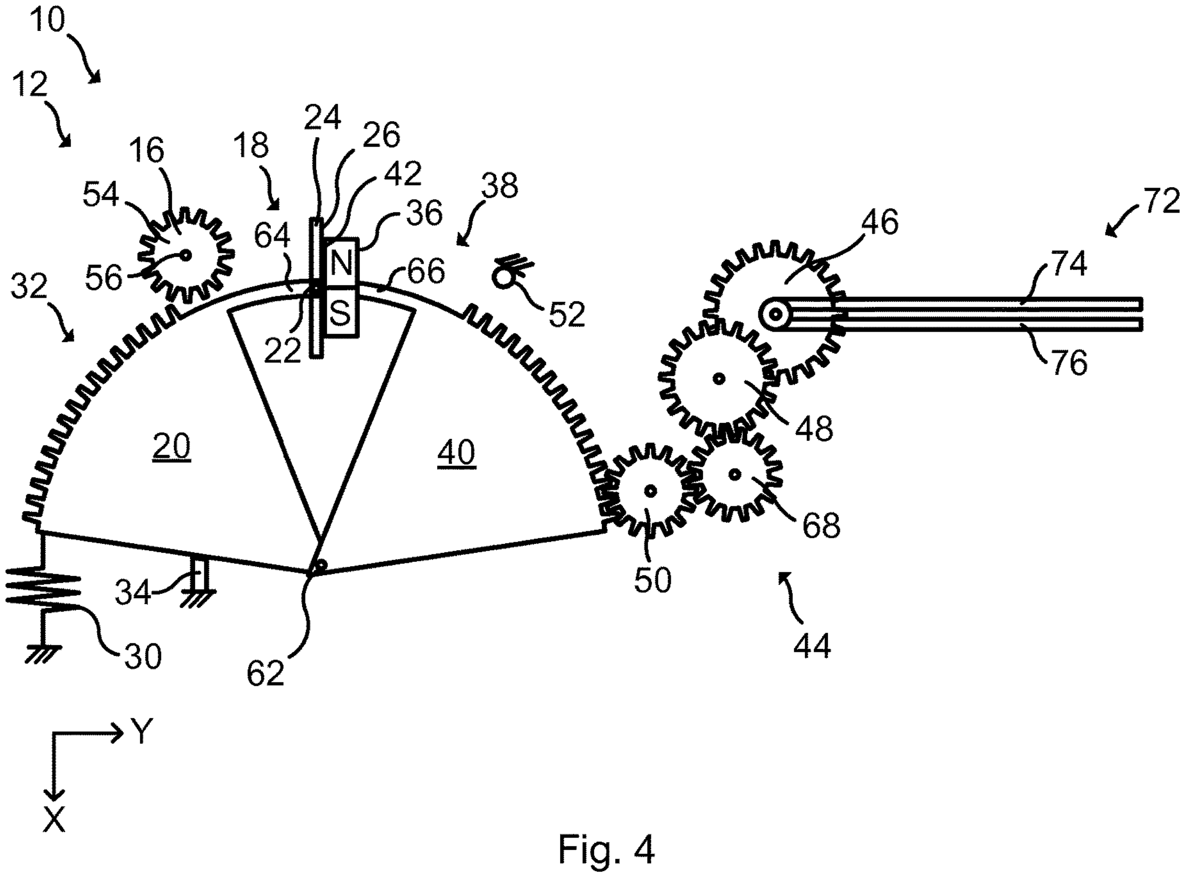
FIG. 4: schematically represents a further example of an energy harvesting system comprising an access member hinge.

FIG. 4 schematically represents a further example of an energy harvesting arrangement 10 comprising an access member hinge 72. Mainly differences with respect to FIGS. 2*a*-2*d* will be described.

The access member hinge 72 in FIG. 4 comprises a first hinge member 74 and a second hinge member 76. The second hinge member 74 of this example is rigidly connected to the first gear wheel 46. The input member 40 of the input device 38 in FIG. 4 is thereby indirectly connected to the second hinge member 76 of the access member hinge 72. Thus, by opening an access member supported by the access member hinge 72, the input device 38 is actuated. The input device 38 of the release mechanism 12 in FIG. 4 has the same function as the input device 38 of the release mechanism 12 in FIGS. 2*a*-2*d*.

Figure 5:
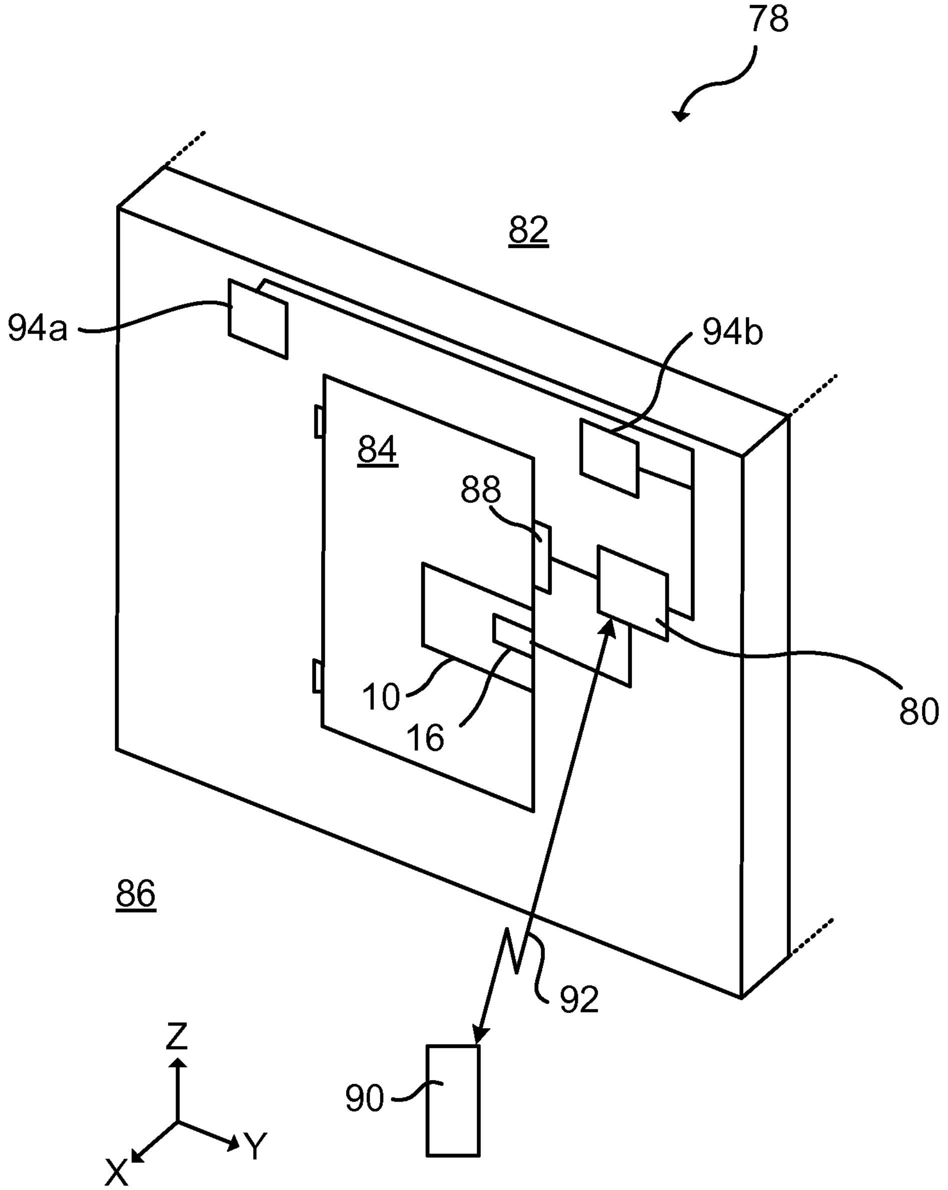
FIG. 5: schematically represents an environment in which embodiments presented herein can be applied.

FIG. 5 schematically represents an environment in which embodiments presented herein can be applied. More specifically, FIG. 5 shows an electronic locking system 78 comprising the energy harvesting arrangement 10 according to the present disclosure and an electronic access control device 80. The access control device 80 is powerable by the electromagnetic generator 16 of the energy harvesting arrangement 10.

Access to a physical space 82 is restricted by a movable access member 84 which is selectively unlockable. The movable access member 84 is positioned between the restricted physical space 82 and an accessible physical space 86. Note that the accessible physical space 86 can be a restricted physical space in itself, but in relation to the access member 84, the accessible physical space 86 is accessible. The movable access member 84 can be a door, gate, hatch, cabinet door, drawer, window, etc.

The electronic access control device 80 is arranged to unlock the access member 84. The access control device 80 is connected to a physical lock 88, which is controllable by the access control device 80 to be set in an unlocked state or locked state.

The access control device 80 communicates with a portable key device 90 over a wireless interface 92 using a plurality of antennas 94*a*-*b*. The portable key device 90 is any suitable device portable by a user and which can be used for authentication over the wireless interface 92. The portable key device 90 is typically carried or worn by the user and may be implemented as a mobile phone, smartphone, key fob, wearable device, smart phone case, RFID (Radio Frequency Identification) card, etc. In FIG. 5, two antennas 94*a*-*b* can be seen. However, only one antenna or more than two antennas may be provided in connection with the access control device 80. Using wireless communication, the authenticity and authority of the portable key device 90 can be checked in an access control procedure, e.g. using a challenge and response scheme, after which the access control device 80 grants or denies access.

When the access control procedure results in granted access, the access control device 80 sends an unlock signal to the lock 88, whereby the lock 88 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock 88), or alternatively using a wireless interface.

When the lock 88 is in an unlocked state, the access member 84 can be opened and when the lock 88 is in a locked state, the access member 84 cannot be opened. In this way, access to a restricted physical space 82 can be controlled by the access control device 80.

While the present disclosure has been described with reference to exemplary embodiments, it will be appreciated that the present invention is not limited to what has been described above. For example, it will be appreciated that the dimensions of the parts may be varied as needed.

What is claimed is:

1. Release mechanism for an energy harvesting arrangement for an electronic locking system, the release mechanism comprising:

a drive device for driving an electromagnetic generator, the drive device comprising a substantially planar drive device surface;

a harvesting elastic element arranged to force the drive device towards a starting position, and arranged to store mechanical energy from displacement of the drive device from the starting position along a harvesting path;

at least one magnet;

an input device, the input device being movable along the harvesting path, and comprising a substantially planar input device surface arranged to mate with the drive device surface to establish a mating interface; and an engaging profile arranged offset with respect to the mating interface;

wherein the input device is arranged to engage the drive device by means of a magnetic force, generated by the magnet and acting between the drive device surface and the input device surface, such that the drive device can be displaced from the starting position by movement of the input device a long the harvesting path; and wherein the engaging profile is arranged to engage the drive device at an engaging position of the drive device, such that further movement of the input device along the harvesting path causes a relative inclination between the drive device surface and the input device surface.

2. The release mechanism according to claim 1, wherein the release mechanism comprises a hinge arranged to support the relative inclination between the drive device surface and the input device surface.

3. The release mechanism according to claim 2, wherein the hinge substantially centered with respect to the magnet when the planar input device surface and the drive device surface mate.

4. The release mechanism according to claim 1, wherein the release mechanism comprises a plate, wherein the plate comprises the drive device surface or the input device surface.

5. The release mechanism according to claim 4, wherein the drive device comprises the plate.

6. The release mechanism according to claim 1, wherein the input device comprises the magnet.

7. The release mechanism according to claim 1, wherein the magnetic force is 10% to 30% larger than the force from the harvesting elastic element when the drive device is in the engaging position.

8. The release mechanism according to claim 1, wherein the input device is arranged to engage the drive device by means of an attractive magnetic force.

9. The release mechanism according to claim 1, wherein the mating interface is substantially perpendicular to the harvesting path.

10. The release mechanism according to claim 1, wherein the harvesting path is substantially linear.

11. The release mechanism according to claim 1, wherein the harvesting path substantially circular.

12. Energy harvesting arrangement comprising a release mechanism according to claim 1.

13. The energy harvesting arrangement according to claim 12, further comprises a handle operatively coupled to the input device or an access member hinge operatively coupled to the input device.

14. The energy harvesting arrangement according to claim 12, wherein the input device arranged to be actuated by means of a key.

15. Electronic locking system comprising a release mechanism according to claim 1.

16. Electronic locking system comprising an energy harvesting arrangement according to claim 12.

* * * * *